United States Patent
Yamada (10) Patent No.: US 9,049,404 B2
(45) Date of Patent: Jun. 2, 2015

(54) IMAGE PROCESSING APPARATUS AND METHOD THAT PERFORM MULTIPLE IMAGE PROCESSES, AND STORAGE MEDIUM STORING A PROGRAM THEREOF, FOR DECOMPRESSING A COMPRESSED IMAGE ACCORDING TO FIRST AND SECOND INFORMATION INDICATING IMAGE PROCESSING TO BE PERFORMED

(75) Inventor: Naoto Yamada, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 271 days.

(21) Appl. No.: 13/023,808

(22) Filed: Feb. 9, 2011

(65) Prior Publication Data

US 2011/0205565 A1 Aug. 25, 2011

(30) Foreign Application Priority Data

Feb. 22, 2010 (JP) ................................ 2010-036122

(51) Int. Cl.
*H04N 1/60* (2006.01)
(52) U.S. Cl.
CPC ........................................ *H04N 1/60* (2013.01)
(58) Field of Classification Search
USPC ....................................................... 358/1.9
See application file for complete search history.

(56) References Cited

U.S. PATENT DOCUMENTS

| 5,493,408 | A | * | 2/1996 | Kurogane et al. ............. 358/296 |
| 6,145,014 | A | * | 11/2000 | Chong .......................... 719/328 |
| 6,535,221 | B1 | * | 3/2003 | Allen et al. .................... 345/611 |
| 7,003,165 | B2 | * | 2/2006 | Kuroda et al. ................ 382/233 |
| 2006/0232833 | A1 | * | 10/2006 | Kim ............................... 358/474 |
| 2007/0139536 | A1 | * | 6/2007 | Watanabe ............... 348/231.99 |
| 2008/0144952 | A1 | * | 6/2008 | Chen et al. .................... 382/239 |

FOREIGN PATENT DOCUMENTS

JP 2002-271791 A 9/2002

* cited by examiner

*Primary Examiner* — Steven Kau
(74) *Attorney, Agent, or Firm* — Rossi, Kimms & McDowell LLP

(57) ABSTRACT

An image processing apparatus that can decompress image data in appropriate manners suitable for a plurality of processes, and simplify and speed up the processes. Blocks of image data are compressed, and information indicative of procedures of the processes to be performed on the blocks of image data by a plurality of image processing units is added to the compressed blocks of image data. Decompression methods for the compressed blocks of image data are determined according to the procedures in the information added to the compressed blocks of image data. The compressed blocks of image data are decompressed using the determined decompression methods.

12 Claims, 10 Drawing Sheets

DECOMPRESSION LEVEL DETERMINATION TABLE

| DECOMPRESSION LEVEL | UNIT ID CODE/MODE CODE | |
|---|---|---|
| DECOMPRESSION LEVEL 1: 300 DPI RESOLUTION | 0000: COLOR PROCESS<br>0001: ROTATION PROCESS<br>0010: BLANK SHEET DETERMINATION | |
| DECOMPRESSION LEVEL 2: 600 DPI RESOLUTION | 0011: SIMPLE DECIMATION<br>0100: MASKING<br>0100: TRIMMING | MODE 01<br>MODE 00<br>MODE 01 |
| DECOMPRESSION LEVEL 3: 1200 DPI RESOLUTION (RAW DATA) | 0011: ZOOMING<br>0101: BINARY CODING PROCESS<br>0110: MULTILEVEL CODING PROCESS | MODE 00 |

1111: END OF INSTRUCTION

FIG.10

IMAGE PROCESSING APPARATUS AND METHOD THAT PERFORM MULTIPLE IMAGE PROCESSES, AND STORAGE MEDIUM STORING A PROGRAM THEREOF, FOR DECOMPRESSING A COMPRESSED IMAGE ACCORDING TO FIRST AND SECOND INFORMATION INDICATING IMAGE PROCESSING TO BE PERFORMED

BACKGROUND OF THE INVENTION

1. Field of the Invention

The present invention relates to an image processing apparatus and method that can perform a plurality of image processes, as well as a computer-readable storage medium storing a program for causing a computer to implement the method.

2. Description of the Related Art

For conventional encoding methods, there has been proposed a technique to process image data in a plurality of blocks so as to facilitate parallel processing (see, for example, Japanese Laid-Open Patent Publication (Kokai) No. 2002-271791). Also, in Japanese Laid-Open Patent Publication (Kokai) No. 2002-271791, there has been proposed a technique to handle image data encoded in blocks from the viewpoint of simplifying and speeding up processes and enhancing image quality. Further, according to Japanese Laid-Open Patent Publication (Kokai) No. 2002-271791, top addresses in respective lines of image data encoded in N×N blocks are calculated and recorded, so that a rotation process can be performed while referring to and reading out the top addresses.

However, when a plurality of image processes are to be performed in a format encoded on a block-by-block basis as described in Japanese Laid-Open Patent Publication (Kokai) No. 2002-271791, problems explained hereafter arise. For example, when only a rotation process is to be performed on image data, encoded image data is rotated as it is, but when a resolution changing process as well as a rotation process is to be performed on image data, it is necessary to decode image data once. Thus, when a group of pixel blocks for a job in which a rotation process is performed and a group of pixel blocks for a job in which a resolution changing process as well as a rotation process is performed are to be processed at the same time, it is necessary to change decompression settings of an encoder so that the most suitable formats for the respective processes can be obtained.

SUMMARY OF THE INVENTION

The present invention provides an image processing apparatus and method that can decompress image data in appropriate manners suitable for a plurality of processes, and simplify and speed up the processes, as well as a computer-readable storage medium storing a program for causing a computer to implement the method.

Accordingly, a first aspect of the present invention provides an image processing apparatus including a plurality of image processing units that perform different processes on image data, comprising a compressing unit configured to compress blocks of image data, an adding unit configured to add, to the compressed blocks of image data, information indicative of procedures of the processes to be performed on the blocks of image data by a plurality of image processing units, a determining unit configured to refer to the information added to the compressed blocks of image data, and determine decompression methods for the compressed blocks of image data according to the procedures indicated by the information, and a decompressing unit configured to decompress the compressed blocks of image data using the determined decompression methods.

Accordingly, a second aspect of the present invention provides an image processing method for an image processing apparatus including a plurality of image processing units that perform different processes on image data, comprising a compressing step of compressing blocks of image data, an adding unit step of adding, to the compressed blocks of image data, information indicative of procedures of the processes to be performed by a plurality of image processing units on the blocks of image data, a determining step of referring to the information added to the compressed blocks of image data, and determining decompression methods for the compressed blocks of image data according to the procedures indicated by the information, and a decompressing step of decompressing the compressed blocks of image data using the determined decompression methods.

Accordingly, a third aspect of the present invention provides a non-transitory storage medium storing a computer-readable program for causing an image processing apparatus to execute an image processing method as described above.

According to the present invention, image data can be decompressed in appropriate manners suitable for a plurality of processes, and the processes can be simplified and speeded up.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

Figure 1:
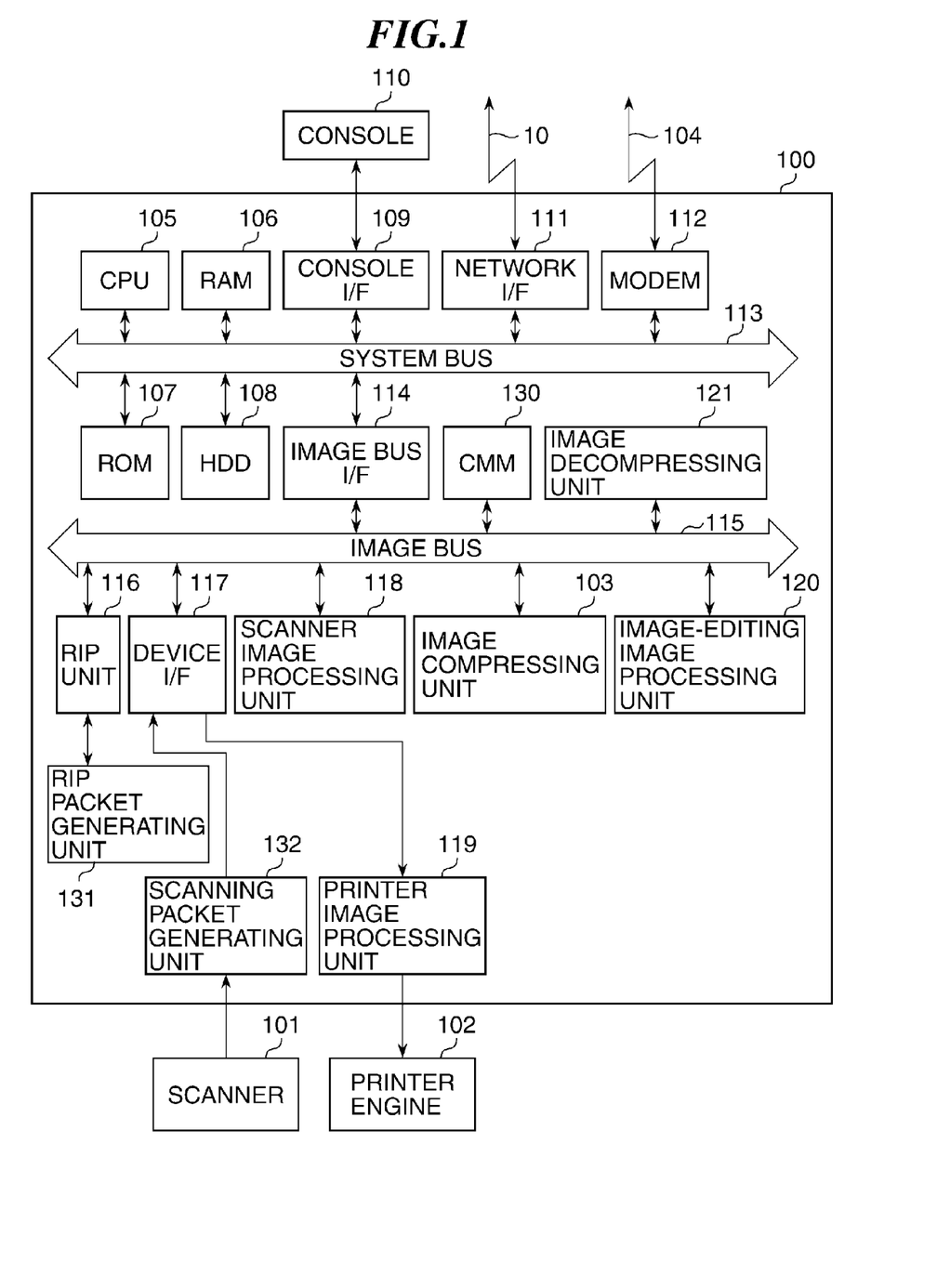
FIG. 1 is a block diagram schematically showing an overall arrangement of an image processing apparatus according to a first embodiment of the present invention.

FIG. 1 is a block diagram schematically showing an overall arrangement of an image processing apparatus according to a first embodiment of the present invention.

Referring to FIG. 1, the image processing apparatus 100 is connected to a scanner 101, an image input device, and a printer engine 102, an image output device, and control them so as to read images and produce printed outputs. The image processing apparatus 100 is also connected to a LAN 10 and the public line 104, and provides control to input and output image information and device information via the LAN 10 and a public line 104. Moreover, in the present embodiment, the image processing apparatus 100, the scanner 101, the printer engine 102, and a console 110 constitute an image forming apparatus.

In the image processing apparatus 100, a CPU 105 is a central processing unit that controls the overall operation of the image forming apparatus including the image processing apparatus 100. A RAM 106 acts as a work memory for operation of the CPU 105 as well as an image memory for temporarily storing input image data. A ROM 107 is a boot ROM, which stores a system boot program. An HDD 108 is a hard disk drive, which stores system software for various processes, input image data, and so on.

A console I/F 109 is an interface unit connected to the console 110, and outputs data and others for displaying an operation screen to the console 110. The console I/F 109 plays a role in passing, to the CPU 105, information input by an operator from the console 110.

A network I/F 111 is a communication interface unit connected to a network such as the LAN 10, and is comprised of, for example, a LAN card. The network I/F 111 inputs and outputs information to and from external apparatuses such as personal computers (PC), other image forming apparatuses, and image processing apparatuses on the LAN 10. A modem 112 is connected to the public line 104, and inputs and outputs information to and from the external apparatuses.

The CPU 105, the RAM 106, the ROM 107, the HDD 108, the console I/F 109, the network I/F 111, the modem 112, and an image bus I/F 114 are placed on a system bus 113.

The image bus I/F 114 is an interface for connecting the system bus 113 with an image bus 115 that transfers image data at high speed, and is a bus bridge that transforms data structures. To the image bus 115 are connected a raster image processor (RIP) unit 116, a device I/F 117, a scanner image processing unit 118, an image-editing image processing unit 120, an image compressing unit 103, an image decompressing unit 121, and a color management module (CMM) 130.

The raster image processor (RIP) unit 116 expands a page description language (PDL) code into image data, and outputs the image data as page data arranged in page order to a RIP packet generating unit 131. The RIP packet generating unit 131 successively stores, in an internal buffer (not shown), the page data input from the RIP unit 116. The page data stored in the buffer is divided into arbitrary pixel blocks of rectangular data (pixel data) and read out, and information, to be described later, is added as header data to the divided pixel data. Then, attribute data indicative of attributes of each piece of pixel data is added to each piece of pixel data to generate a data packet.

The device I/F 117 connects to the scanner 101 and the printer engine 102 via a scanning packet generating unit 132 and a printer image processing unit 119 to perform synchronous-to-asynchronous conversion of image data. The scanning packet generating unit 132 successively stores, in an internal buffer (not shown), page data input from the scanner 101 and arranged in scanning order. The page data stored in the buffer is divided into arbitrary pixel blocks of rectangular data (pixel data) and read out, and information, to be described later, is added as header data to the divided pixel data. Then, attribute data indicative of attributes of each piece of pixel data is added to each piece of pixel data to generate a data packet.

The scanner image processing unit 118 performs various processes such as correction, processing, and edition on image data input from the scanner 101 via the scanning packet generating unit 132. The image-editing image processing unit 120 performs various image processes such as rotation, resolution increase/decrease, color processing, trimming, masking, binary coding, multilevel coding, and blank sheet determination on image data. The image compressing unit 103 encodes image data processed by the RIP unit 116, the scanner image processing unit 118, and the image-editing image processing unit 120 using a predetermined compression method. The compressed image data is temporarily stored in the HDD 108.

The image decompressing unit 121 decodes and decompresses the compressed image data, which is stored in the HDD 108, as the need arises. The decompressed image data is subjected to processing by the image-editing image processing unit 120, subjected to image processing by the printer image processing unit 119, and output to the printer engine 102.

The printer image processing unit 119 subjects image data to be printed out to processes such as image correction suitable for the printer engine 102. The CMM 130 is a dedicated hardware module that subjects image data to a color conversion process (also referred to as a color space conversion process) based on profiles and calibration data. The profiles are information such as functions for converting color image data expressed in a color space dependent on the apparatus into a color space independent of the apparatus (such as a Lab color space). The calibration data is data for correcting color reproduction characteristics of the scanner 101 and the printer engine 102.

Figure 2:
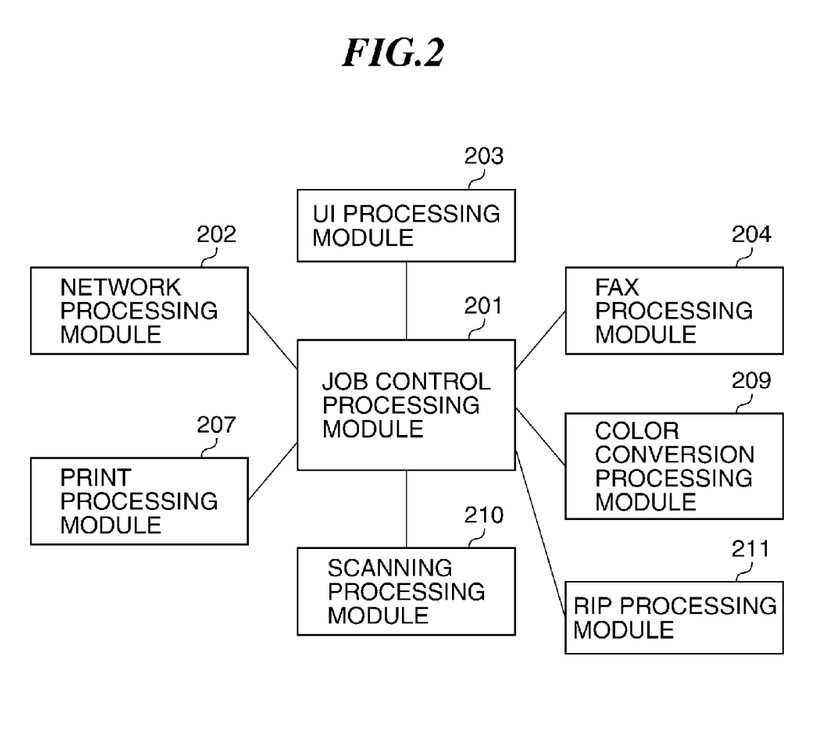
FIG. 2 is a block diagram showing software modules operating on a CPU shown in FIG. 1.

FIG. 2 is a block diagram showing software modules operating on the CPU 105 shown in FIG. 1.

A job control processing module 201 performs centralized control of software modules (shown or not shown) operating on the CPU 105 so as to control all jobs processed in the image forming apparatus such as copying, printing, scanning, and fax transmission and reception. A network processing module 202 is a module that controls communication with external devices carried out mainly via the network I/F 111, and controls communication with devices on the LAN 10. For example, upon receiving a control command or data from a device on the LAN 10, the network processing module 202 posts the contents thereof to the job control processing module 201. Also, based on an instruction from the job control processing module 201, the network processing module 202 sends the control command or data to a predetermined device on the LAN 10.

A UI processing module 203 performs control related mainly to the console 110 and the console I/F 109. The UI processing module 203 posts an operation of the console 110 by an operator to the job control processing module 201, and based on an instruction from the job control processing module 201, controls display on a display screen on the console 110.

A fax processing module 204 controls a fax function. For example, the fax processing module 204 receives a fax via the modem 112, subjects the received fax image to image processing, and posts the image data subjected to the image process to the job control processing module 201. Also, the fax processing module 204 sends an image designated by the job control processing module 201 to a designated destination by fax.

Based on instructions from the job control processing module 201, a printing processing module 207 controls the image-editing image processing unit 120, the printer image processing unit 119, and the printer engine 102 to perform printing of designated image data. For example, the print processing module 207 receives image data, image information (image data size, color mode, resolution, etc.), and layout information (offset, enlargement/reduction, pagination, etc.) from the job control processing module 201. Further, the print processing module 207 receives output sheet information (size, printing direction, etc.) and other information. Then, the print processing module 207 controls the image compressing unit 103, the image decompressing unit 121, the image-editing image processing unit 120, and the printer image processing unit 119 to perform appropriate image processing on image data, and controls the printer engine 102 to print the image data on a designated sheet.

A scan processing module 210 controls the scanner 101, the scanning packet generating unit 132, and the scanner image processing unit 118 based on instructions from the job control processing module 201. The scan processing module 210 scans an original placed on an original platen glass of the scanner 101, and inputs image data. For example, the scan processing module 210 performs processing in accordance with a color mode included in an instruction from the job control processing module 201. Specifically, when the color mode is Color, the scan processing module 210 inputs an original as color image data, and when the color mode is Monochrome, the scan processing module 210 inputs an original as monochrome image data. Also, when the color mode is Auto, the scan processing module 210 performs pre-scanning or the like to determine whether an image on an original is a color image or a monochrome image, and based on the determination result, scans the original again to input color image data or monochrome image data. Color information on the input image data is posted to the job control processing module 201.

Moreover, the scan processing module 210 subjects the input image data to image processing such as image compression by controlling the scanner image processing unit 118, and then posts the image data subjected to the image processing to the job control processing module 201.

In accordance with instructions from the job control processing module 201, a color conversion processing module 209 performs a color conversion process on image data, and posts the image data subjected to the color conversion process to the job control processing module 201. The job control processing module 201 posts, to the color conversion processing module 209, input color space information, output color space information, and image data to which color conversion is applied. When the output color space posted to the color conversion processing module 209 is a color space which is not dependent on an input device (for example, a Lab color space), input profile information for converting an input color space which is dependent on an input device (for example, an RGB color space) into a Lab color space is also posted to the color conversion processing module 209. In this case, the color conversion processing module 209 creates a lookup table (LUT) for mapping from an input color space to a Lab color space using the input profile, and performs color conversion on an input image using this LUT.

Also, when the input color space posted to the color conversion processing module 209 is a Lab color space, output profile information for converting a Lab color space into an output color space which is dependent on an output device is also posted to the color conversion processing module 209. In this case, the color conversion processing module 209 creates an LUT for mapping from a Lab color space to an output color space using the output profile, and performs color conversion on an input image using this LUT.

Also, when both the input color space and the output color space posted to the color conversion processing module 209 are device-dependent color spaces, both an input profile and an output profile are posted to the color conversion processing module 209. In this case, the color conversion processing module 209 creates an LUT for mapping directly from an input color space to an output color space using the input profile and the output profile, and performs color conversion on an input image using this LUT. When CMM 130 is present inside the apparatus, the color conversion processing module 209 sets the created LUT in the CMM 130, and thus performs color conversion using the CMM 130. On the other hand, when the CMM 130 is not present inside the apparatus, the CPU 105 performs color conversion by software means.

Based on instructions from the job control processing module 201, a RIP processing module 211 interprets a PDL (page description language) code, and expands the same into a bitmap image by controlling the RIP unit 116 to perform rendering. Further, the RIP processing module 211 causes the RIP packet generating unit 131 to configure settings and perform control for generating packet data.

Figure 3A:
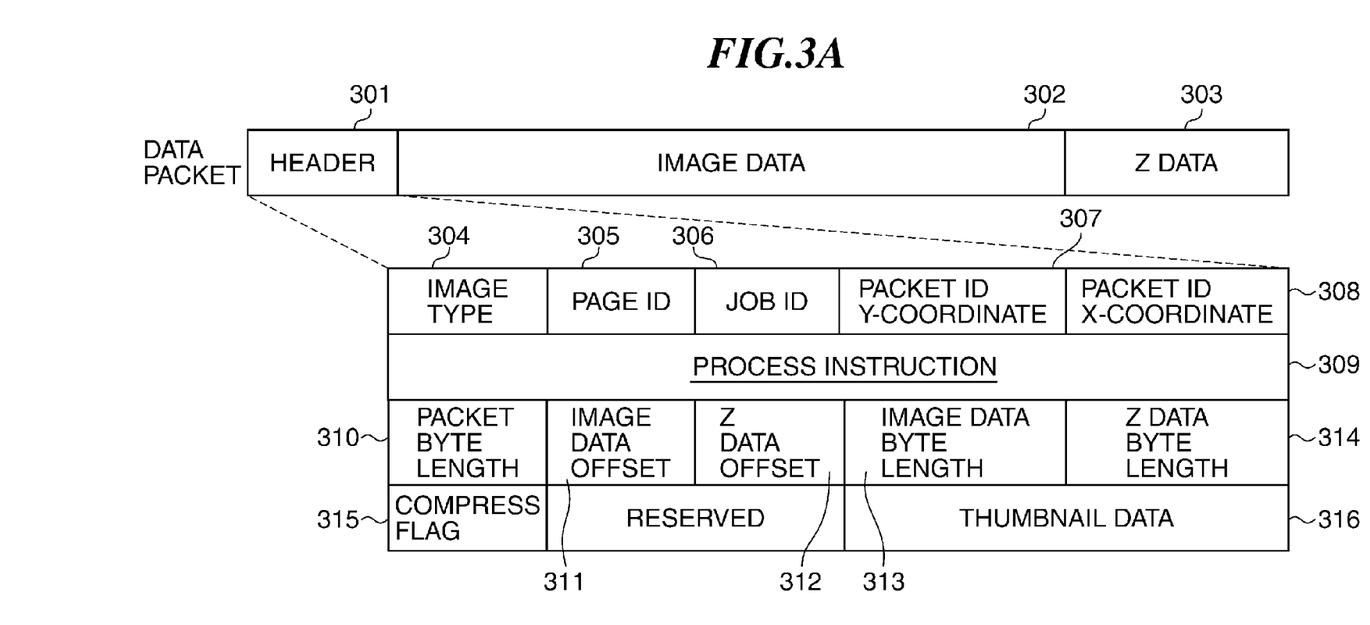
FIG. 3A is a diagram showing an exemplary arrangement of packet data handled by an image processing apparatus shown in FIG. 1.
Figure 3B:
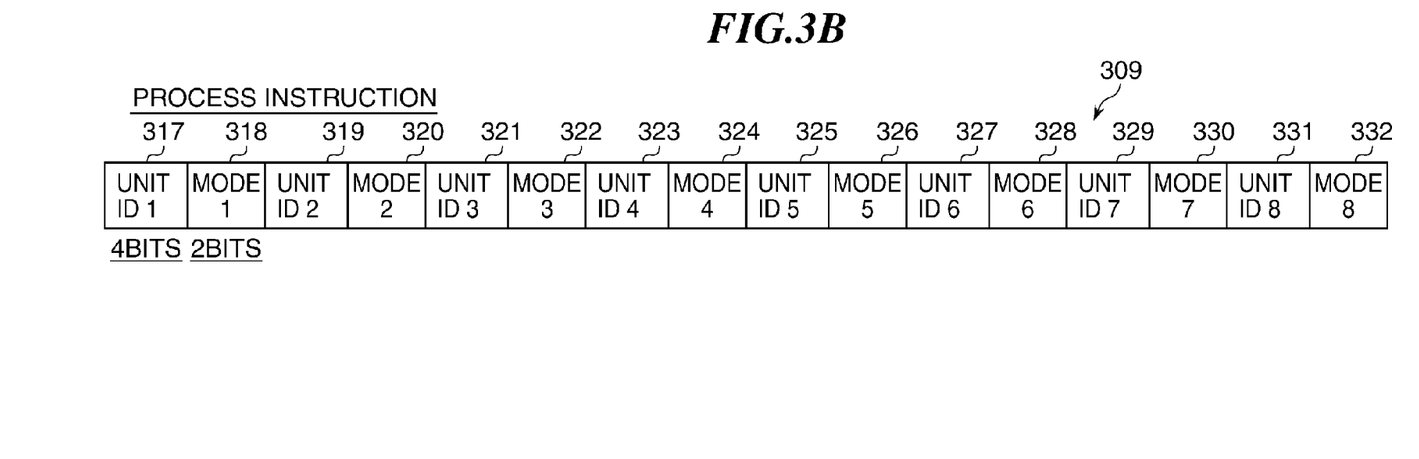
FIG. 3B is a diagram showing in detail an exemplary arrangement of a process instruction in the packet data.

FIG. 3A is a diagram schematically showing an exemplary arrangement of a data packet handled by an image processing apparatus 100 shown in FIG. 1, and FIG. 3B is a diagram showing in detail an exemplary arrangement of a process instruction in the data packet shown in FIG. 3A. One data packet handled in the present embodiment corresponds to a 32×32 pixel block, but the present invention is not limited to this.

The data packet shown in FIG. 3A is a data packet (Data Packet) generated by the scanning packet generating unit 132 or the RIP packet generating unit 131. The data packet is comprised of image data (Image Data) 302 of a predetermined size to which a header (Header) 301 and attribute data (Z data) 303 are added. The attribute data (Z data) 303 is indicative of attributes of the image data 302.

First, a detailed description will be given of information in the header 301.

An image type (Image Type) 304 is indicative of a data format and a resolution of the image data (Image Data) 302 in the data packet. The image type 304 includes information for identifying RGB, CMYK, or YUV, 300 dpi, 600 dpi, or 1200 dpi, etc. As a page ID (Page ID) 305, a page ID code assigned to a page to which the image data 302 corresponds is stored. As a job ID (Job ID) 306, a job ID code assigned to each job so that the job control processing module 201 or the like can manage jobs is stored.

As a packet ID (Y direction) (Packet ID Y-coordinate) 307 and a packet ID (X direction) (Packet ID X-coordinate) 308, packet ID codes indicative of coordinates on page data are stored. A process instruction (Process Instruction) 309 is indicative of processes to be performed on the data packet. When a plurality of processes are set, process information identifying the plurality of processes is sequentially set in a manner being left aligned in the process instruction 309. Each of processing units in the image-editing image processing unit 120 shown in FIG. 10 performs the respective processes indicated by the process instruction 309, and then shifts a storage position of processing information in the process instruction 309 by 6 bits to the left as viewed in the figure (see FIG. 3B).

In the process instruction 309 are stored 8 sets of process information, each of which is comprised of a unit ID code individually assigned to a processing unit which should process the image data 302, and a mode code indicative of a processing mode in the concerned processing unit. The term "processing units" here means a color processing unit 402, a rotation processing unit 403, a trimming/masking processing unit 404, a resolution changing processing unit 405, a binary/multilevel coding unit 406, and a blank sheet determination unit 407 shown in FIG. 10. The processing information in the process instruction 309 is set by the print processing module 207 according to each job and job information based on an instruction from the job control processing module 201.

The unit ID (Unit ID) codes 1 to 8 (317, 319, 321, 323, 325, 327, 329, and 331), which have a code length of 4 bits, are information for designating processing units. The mode (Mode) codes 1 to 8 (318, 320, 322, 324, 326, 328, 330, and 332), which have a code length of 2 bits, are information for designating processing mode in processing units. When a process to be performed is identifiable with only a unit ID code, a mode code is not particularly required, and thus a value indicative of this (for example, "00") is set as a mode code. In the present embodiment, storing a value "1111" as a unit ID in the process instruction 309 makes it recognizable that all processes have been completed. Thus, for one data packet, a setting can be made such that up to seven processing units perform processes.

In FIG. 3A, a packet length (Packet Byte Length) 310 is indicative of the total number of bytes in the data packet. An image data offset (Image Data Offset) 311 and an attribute data offset (Z data Offset) 312 are each indicative of an offset amount of data in bytes from a top address in the data packet. An image data length (Image Data Byte Length) 313 is indicative of the number of bytes in image data, and an attribute data length (Z Data Byte Length) 314 is indicative of the number of bytes in attribute data.

A compress flag (Compress Flag) 315 is a flag indicative of whether or not image data in the data packet is compressed. Thumbnail data (Thumbnail Data) 316 is a portion where sampling data for displaying the data packet as thumbnails in an abbreviated manner is stored.

Next, a description will be given of an operation process in which the image processing apparatus 100 receives a print job from an external device via the LAN 10, and performs printing using the printer engine 102 based on the print job.

The image processing apparatus 100 receives, via the network I/F 111, a PDL (page description language) code sent from an external device via the LAN 10. The received PDL code is input to the RIP unit 116 via the system bus 113, the image bus I/F 114, and the image bus 115.

The RIP unit 116 performs PDL interpretation on the input PDL code, converts the PDL code to code data processible by the RIP unit 116, and performs rendering based on the code data. The page data subjected to the rendering by the RIP unit 116 is successively stored in a buffer (not shown) in the RIP packet generating unit 131. Then, the RIP packet generating unit 131 divides the page data stored in the buffer into arbitrary pixel blocks (for example, 32×32) of rectangular data, reads out the same, and adds the header 301 including a process instruction to each piece of rectangular data. The rectangular data corresponds to the image data 302. Further, the RIP packet generating unit 131 adds, to each piece of rectangular data, the attribute data 303 output together with the rectangular data from the RIP unit 116, thus generating the data packet shown in FIG. 3A. The generated data packet is compressed by the image compressing unit 103 so as to be temporarily stored in the HDD 108.

A description will now be given of a compression method for compression performed in the present embodiment, and an arrangement of the image compressing unit 103 that performs compression using the compression method.

Figure 4A:
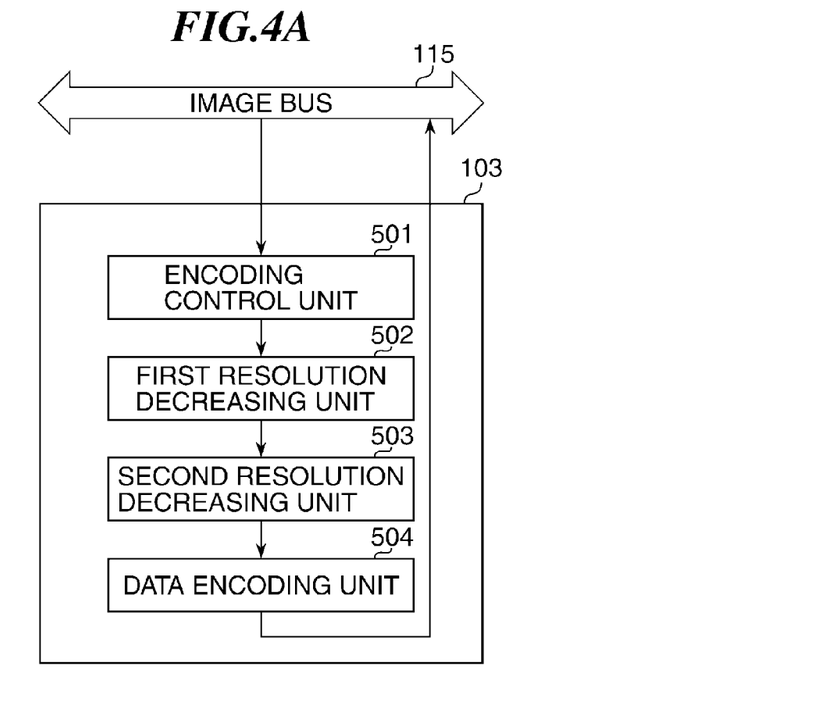
FIG. 4A is a block diagram showing an internal arrangement of an image compressing unit.
Figure 4B:
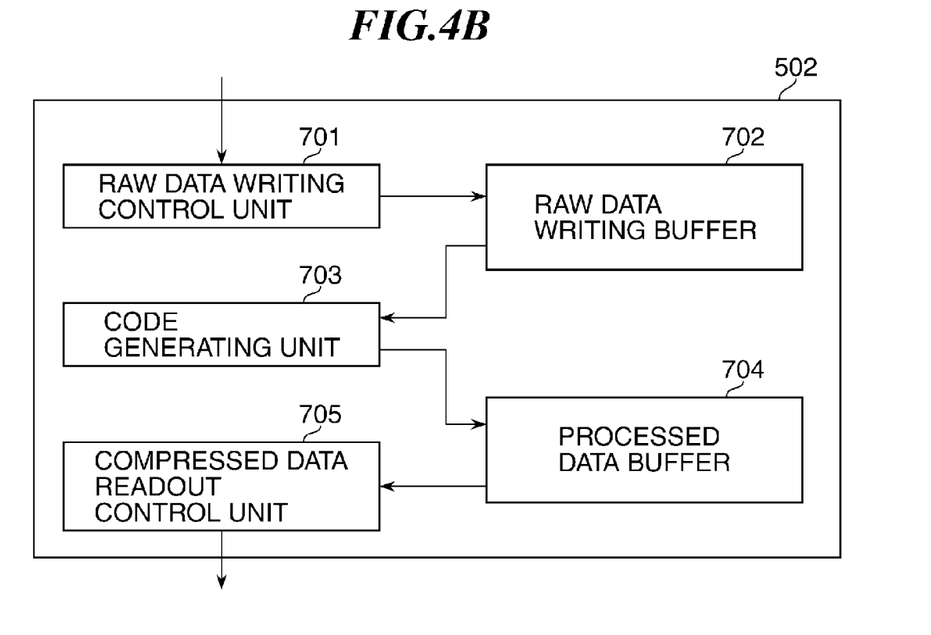
FIG. 4B is a block diagram schematically showing an internal arrangement of a first resolution decreasing unit constituting the image compressing unit.

FIG. 4A is a block diagram showing an internal arrangement of the image compressing unit 103, and FIG. 4B is a block diagram schematically showing an internal arrangement of a first resolution decreasing unit constituting the image compressing unit 103.

Referring to FIG. 4A, the image compressing unit 103 has an encoding control unit 501, the first resolution decreasing unit 502, a second resolution decreasing unit 503, and a data encoding unit 504.

When a data packet is input to the image compressing unit 103 via the image bus 115, first, the encoding control unit 501 decodes the above described header 301 in the data packet. The encoding control unit 501 refers to the compress flag 315 in the header 301 to ascertain that image data in the data packet is uncompressed raw data, determines to perform compression, and outputs the data packet to the first resolution decreasing unit 502. The first resolution decreasing unit 502 then compresses the data packet to low-resolution data.

Referring to FIG. 4B, the first resolution decreasing unit 502 has a raw data writing control unit 701, a raw data writing buffer 702, a code generating unit 703, a processing data buffer 704, and a compressed data readout control unit 705.

Figure 5:
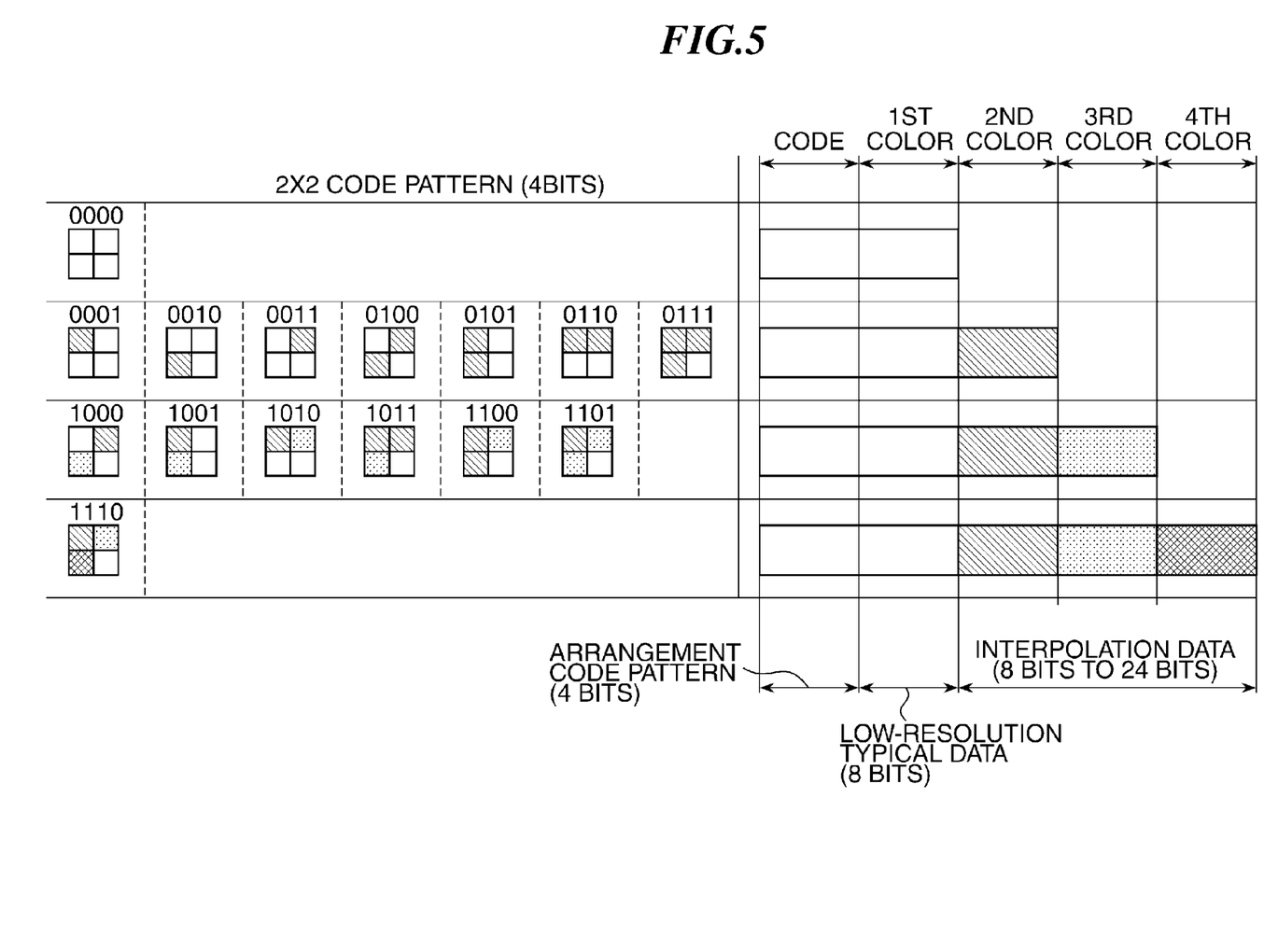
FIG. 5 is a diagram showing exemplary 2×2 arrangement code patterns.

The raw data writing control unit 701 sequentially writes, in the raw data writing buffer 702, data packets input to the first resolution decreasing unit 502. The code generating unit 703 divides the image data 302 of each data packet written in the raw data writing buffer 702 into 2×2 block data, and sequentially reads out the 2×2 block data. Then, the code generating unit 703 analyzes an arrangement of pixel data in the read-out 2×2 block data. Then, the code generating unit 703 extracts arrangement pattern code data (4 bits) and low-resolution typical data (1 pixel: 8 bits), described later, from the 2×2 block data. At the same time, the code generating unit 703 generates interpolation data (8 to 24 bits) required for restoring low-resolution data to original resolution data. Referring now to FIG. 5, a description will be given of how the code generating unit 703 performs compression to low-resolution data.

First, by using 15 types of 2×2 arrangement code patterns (4 bits) shown in FIG. 5, arrangement codes "0000" to "1110" are assigned to respective pieces of 2×2 block data (coding). For example, when all pixel data in 2×2 block data are the same, the code "0000" is assigned to the pixel data, and when only upper left pixel data is different in 2×2 block data, the code "0001" is assigned to the data, and when all pixel data in 2×2 block data are different, the code "1110" is assigned to the data. Also, low-resolution typical data is sampled from 2×2 block data (in the present embodiment, a lower right one pixel), and color information on the lower right one pixel is assigned as 1st Color (first color information).

Among the 15 types of 2×2 arrangement code patterns shown in FIG. 5, an arrangement code pattern group in the second column ("0001", "0010", "0011", "0100", "0101", "0110", and "0111") is indicative of blocks comprised of pixels in two colors. Next, color information on one pixel other than a lower right pixel of 2×2 block data is assigned as 2nd Color (second color information) of interpolation data as shown in the figure. An arrangement code pattern group in the third column ("1000", "1001", "1010", "1011", "1100", and "1101") is indicative of blocks comprised of pixels in three colors. As described above, color information on two pixels other than a lower right pixel of 2×2 block data is assigned as 2nd Color (second color information) and 3rd Color (third color information), respectively. Finally, an arrangement code pattern in the illustrated fourth column ("1110") is indicative of a case where all pixels in a block are different, and color information on three pixels other than a lower right pixel are assigned as 2nd Color, 3rd Color, and 4th color (fourth color information), respectively.

In the above described way, arrangement code patterns, low-resolution typical data, and interpolation data are written in respective predetermined regions in the processing data buffer 704.

Also, the attribute data 303 of the data packet is compressed using the same compression method, and similarly written in the processing data buffer 704. Further, the code generating unit 703 reads out the header 301 from the RAM data writing buffer 702, and writes the header 301 in the processing data buffer 704. At this time, in the header 301 added to the data packet, the compress flag 315 is changed to a flag indicative of a state of being compressed to low resolution. Further, information indicative of the byte length, the offset amount, etc. of the data packet (the packet length 310, the image data offset 311, the attribute data offset 312, the image data length 313, and the attribute data length 314) is updated based on the amount of data compressed to low resolution.

Figure 6A:
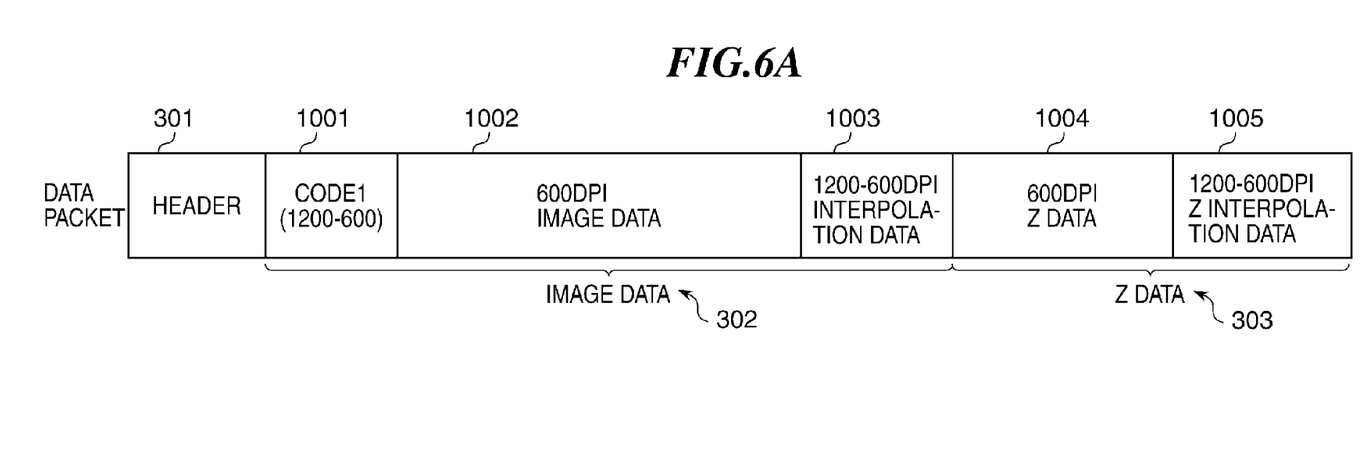
FIG. 6A is a diagram showing an exemplary arrangement of a data packet after all pixels in the data packet are read out as 2×2 block data and coded.

FIG. 6A is a diagram showing an exemplary arrangement of a data packet (32×32) after all pixels in the data packet are read out as 2×2 block data and coded as described above. In the illustrated example, image data in 1200 dpi resolution image data is compressed to 600 dpi resolution image data.

In the data packet stored in the processing data buffer 704, the image data (Image Data) 302 other than the header (Header) 301 is divided into the following three as shown in FIG. 6A: a code 1_1001, 600 dpi image data (600 dpi Image Data) 1002, and 1200 dpi-600 dpi interpolation data 1003.

Further, the attribute data (Z data) 303 is divided into the following two: 600 dpi attribute data (600 dpi Z data) 1004, and 1200 dpi-600 dpi attribute data interpolation data (1200 dpi-600 dpi Z interpolation data) 1005.

The data packets stored in the processing data buffer 704 are sequentially read out by the compressed data readout control unit 705 shown in FIG. 4B, and output to the second resolution decreasing unit 503 shown in FIG. 4A. It should be noted that in the present embodiment, a data packet output from the first resolution decreasing unit 502 is input to and decreased in resolution again by the second resolution decreasing unit 503. In this case, data is decreased in resolution from 1200 dpi to 600 dpi, and then further decreased in resolution from 600 dpi to 300 dpi, but the present invention is not limited to this.

Figure 6B:
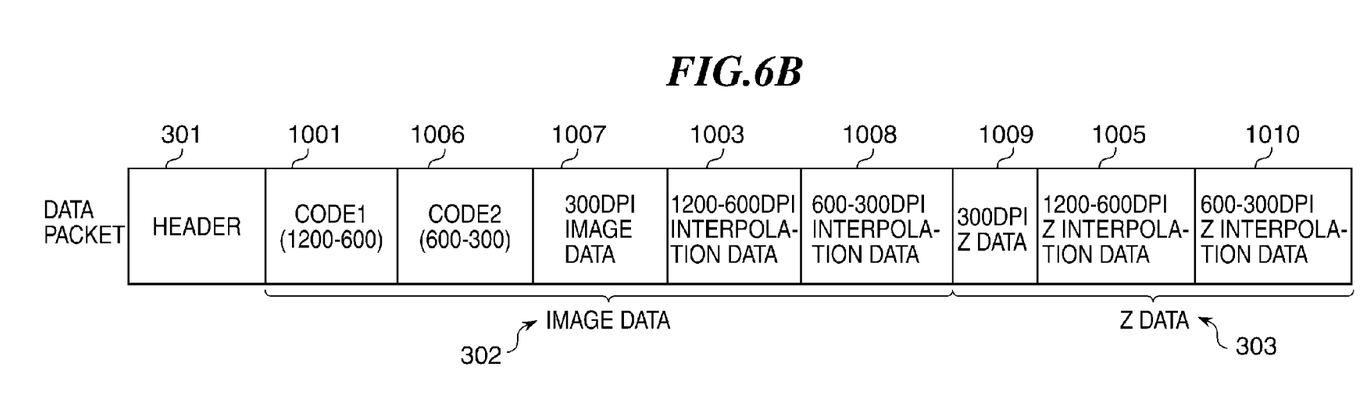
FIG. 6B is a diagram schematically showing an exemplary arrangement of a data packet decreased in resolution to 300 dpi by the first resolution decreasing unit and a second resolution decreasing unit.

FIG. 6B is a diagram schematically showing an exemplary arrangement of the data packet decreased in resolution to 300 dpi by the first resolution decreasing unit 502 and the second resolution decreasing unit 503 shown in FIG. 4A. In the illustrated example, the 600 dpi image data (600 dpi Image Data) 1002, and the 600 dpi attribute data 1004 are compressed to 300 dpi data by the second resolution decreasing unit 503 using the same compression method used in the compression by the first resolution decreasing unit 502.

When converted from 600 dpi to 300 dpi, the image data 302 is divided into the following five: the code 1_1001, a code 2_1006, 300 dpi image data (300 dpi Image Data) 1007, the 1200 dpi-600 dpi interpolation data 1003, and 600 dpi-300 dpi interpolation data 1008. On the other hand, the attribute data 303 is divided into the following three: 300 dpi attribute data (300 dpi Z data) 1009, 1200 dpi-600 dpi attribute data interpolation data 1003 (1200 dpi-600 dpi Z interpolation data) 1005, and 600 dpi-300 dpi attribute data interpolation data (600 dpi-300 dpi Z interpolation data) 1010.

The image data thus decreased in resolution from 1200 dpi to 300 dpi is input to the data encoding unit 504 provided in the next stage of the second resolution decreasing unit 503 shown in FIG. 4A. Then, the 300 dpi image data 1007 is encoded and compressed using JPEG (Joint Photographic Experts Group), and output as a compressed data packet from the image compressing unit 103. The compressed data packet output from the image compressing unit 103 is sent to the RAM 106 via the image bus 115 and the image bus I/F 114, and further sent from the RAM 106 to the HDD 108 and sequentially stored in the HDD 108.

Next, a detailed description will be given of a decompressing process for a compressed data packet, and an arrangement of the image decompressing unit 121 that performs the decompressing process according to the present embodiment.

Figure 7A:
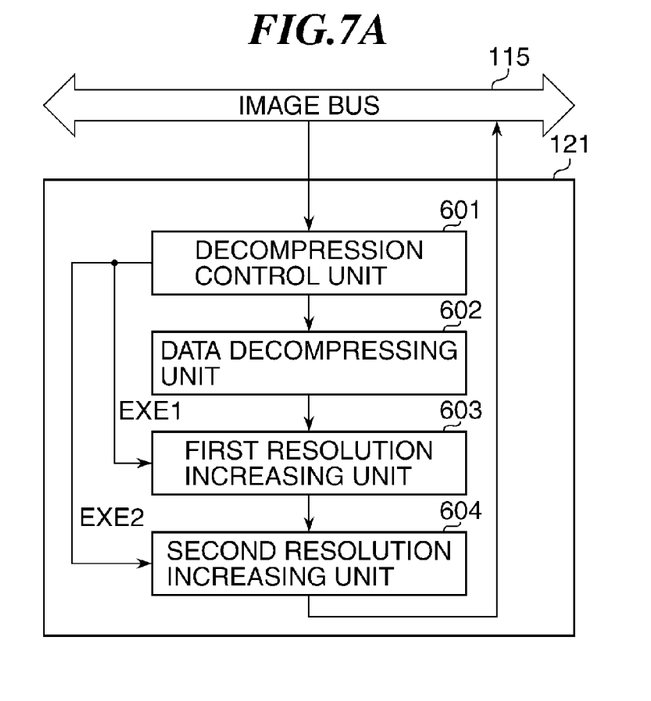
FIG. 7A is a block diagram schematically showing an internal arrangement of an image decompressing unit.
Figure 7B:
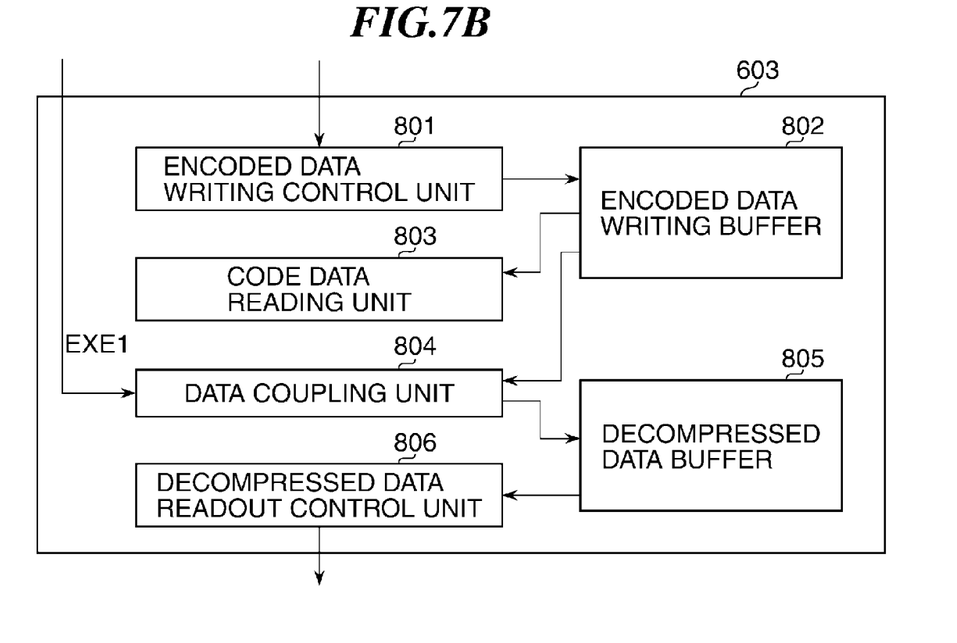
FIG. 7B is a block diagram schematically showing a first resolution increasing unit constituting the image decompressing unit.

FIG. 7A is a block diagram schematically showing an internal arrangement of the image decompressing unit 121, and FIG. 7B is a block diagram schematically showing an internal arrangement of the first resolution increasing unit 603 constituting the image decompressing unit 121.

Referring to FIG. 7A, the image decompressing unit 121 has a decompression control unit 601, a data decompressing unit 602, the first resolution increasing unit 603, and a second resolution increasing unit 604. Referring to FIG. 7B, the first resolution increasing unit 603 has an encoded data writing control unit 801, an encoded data writing buffer 802, a code data reading unit 803, a data coupling unit 804, a decompressed data buffer 805, and a decompressed data readout control unit 806.

Description of parts shown in FIGS. 7A and 7B will be given, including description of flowcharts of FIGS. 8A and 8B.

Based on a print instruction from the job control processing module 201, the print processing module 207 sequentially reads out compressed data packets stored in the HDD 108 to the RAM 106. After that, the print processing module 207 inputs the compressed data packets to the image decompressing unit 121 via the image bus 115 and the image bus I/F 114. Then, the image decompressing unit 121 decompresses the compressed data packets.

Figure 8A:
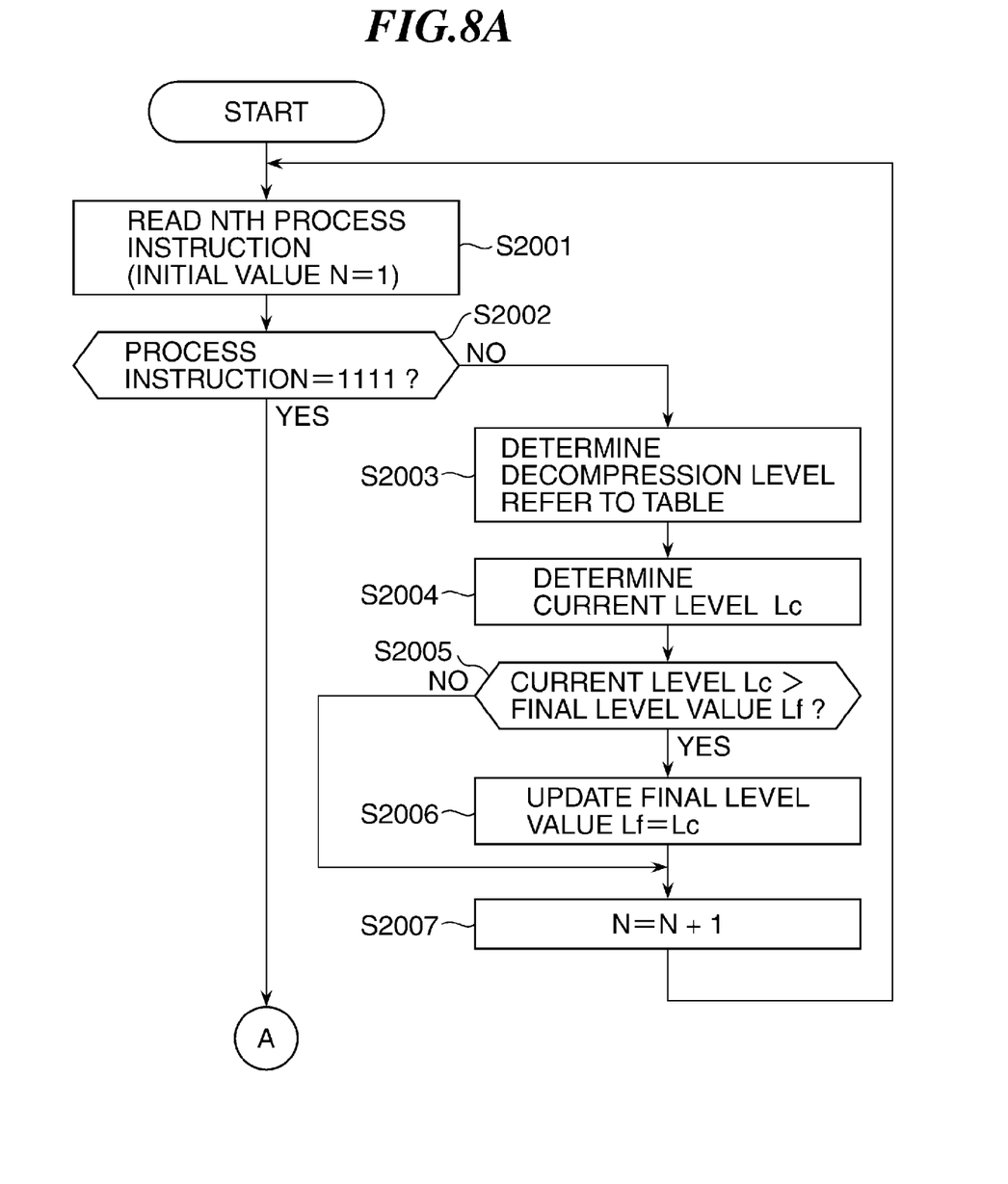
FIGS. 8A and 8B are flowcharts of a resolution increasing process performed by the image decompressing unit.
Figure 8B:
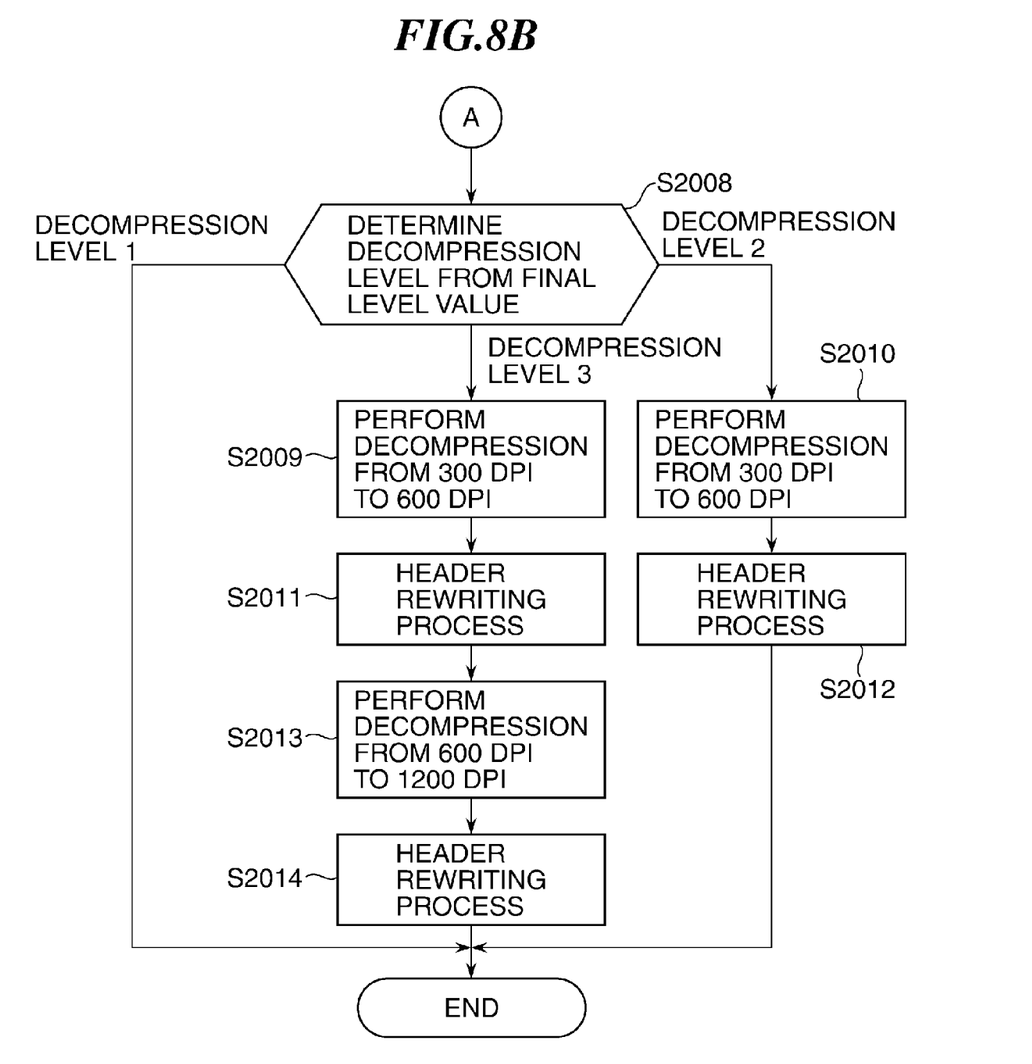
Figure 9:
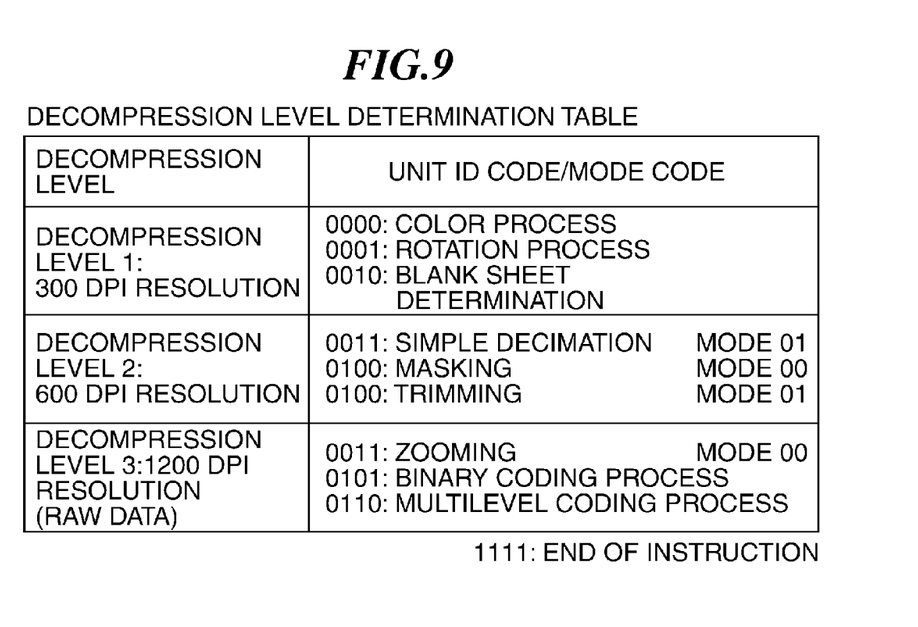
FIG. 9 is a diagram showing an exemplary decompression level determination table showing the relationship between decompression level and processible module mode set by a decompression control unit 601.

Referring next to FIGS. 8A, 8B, and 9, a description will be given of the compressed data packet decompressing process performed by the image decompressing unit 121 according to the present embodiment.

FIGS. 8A and 8B are flowcharts of a resolution increasing process performed by the image decompressing unit 121. FIG. 9 is a diagram showing an exemplary decompression level determination table showing the relationship between decompression level and unit ID code/mode code.

Referring to FIG. 8A, upon receiving a compressed data packet, the decompression control unit 601 reads an Nth unit ID code and an Nth mode code in the process instruction 309 in the header 301 added to the compressed data packet (step S2001). N is a variable, and its initial value is 1. Namely, when N=1, the unit ID code and the mode code are a unit ID 1_317 and a mode 1_318, respectively.

Then, the decompression control unit 601 determines whether or not the Nth unit ID code in the process instruction 309 is a code "1111" indicative of the end of the process (step S2002). When, as a result, it is determined that the Nth unit ID code is the code "1111", the process proceeds to step S2008. On the other hand, when it is determined that the Nth unit ID code is not the code "1111", the process proceeds to step S2003, in which the decompression control unit 601 determines a decompression level by referring to the decompression level determination table shown in FIG. 9.

Figure 10:
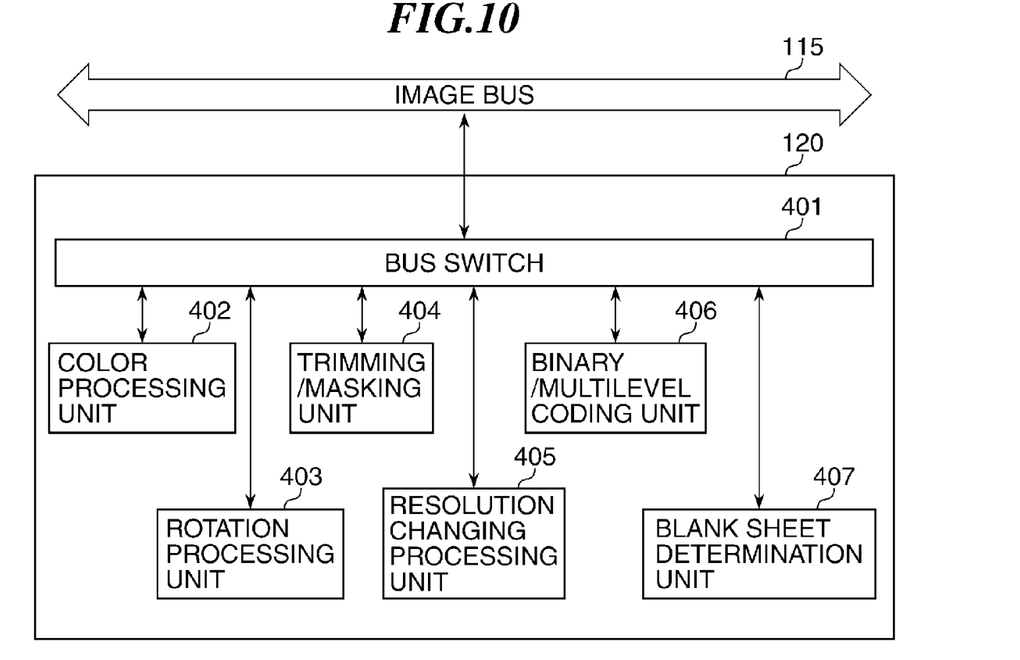
FIG. 10 is a block diagram schematically showing an internal arrangement of an image-editing image processing unit.

Referring to FIG. 9, there are three decompression levels corresponding to respective resolutions (1: 300 dpi, 2: 600 dpi, and 3: 1200 dpi), and unit ID codes and mode codes are associated with each decompression level. For example, unit ID codes corresponding to a color process, a rotation process, and blank sheet determination are associated with the decompression level 1 (300 dpi resolution). The color process is performed by the color processing unit 402, the rotation process is performed by the rotation processing unit 403, and the blank sheet determination is performed by the blank sheet determination unit 407. Also, simple decimation and zooming are performed by the resolution variation processing unit 405, masking and trimming are performed by the trimming and masking processing unit 404, and binary coding and multilevel coding are performed by the binary/multilevel coding unit 406.

In the step S2003 in FIG. 8A, for example, when the Nth unit ID code in the process instruction 309 is a code "0001", the decompression control unit 601 determines that a "rotation process" will be performed, and sets the decompression level at "1" by referring to the decompression level determination table shown in FIG. 9. Then, the decompression control unit 601 assigns the determined decompression level to a current level value Lc stored in an internal register, not shown (step S2004).

Then, the decompression control unit 601 compares the current level value Lc and a final level value Lf with each other (step S2005). The initial value of the final level value Lf is 0. When the current level value Lc is greater than the final level value Lf, the final level value Lf is updated (Lf=Lc) (step S2006). Because the decompression level for the "rotation process" in the first set is the "decompression level 1", 1 is assigned to the final level value Lf.

In the above described way, the decompression level is determined by reading the first set of a unit ID code and a mode code first among a plurality of sets of unit ID codes and mode codes set in the process instruction 309.

Then, to determine a decompression level for the second set of a unit ID code and a mode code set in the process instruction 309, the decompression control unit 601 increments the variable N by 1 (N=N+1) (step S2007). Then, the decompression control unit 601 returns to the step S2001, in which the decompression control unit 601 reads and analyzes the Nth set of a unit ID code and a mode code (the next set is the second set: N=2).

When, as a result of the analysis in the step S2001, for example, the unit ID code and the mode code in the second set (N=2) are "0011" and "01", respectively, the process proceeds from the step S2002 to the step S2003. In the step S2003, because the second unit ID code (N=2) is "0011", the decompression control unit 601 determines that "simple decimation" will be performed, and sets the decompression level at "2" by referring to the decompression level determination table shown in FIG. 9. Then, the decompression control unit 601 assigns the determined decompression level to the current level value Lc stored in the internal register (step S2004).

Then, the decompression control unit 601 compares the current level value Lc and the final level value Lf with each other (step S2005), and when the current level value Lc is greater than the final level value Lf, the final level value Lf is updated (step S2006). Because the decompression level for the "simple decimation" in the second set is the "decompression level 2", 2 is assigned to the final level value Lf.

In the above described way, determination of the decompression level and update of the final level value are repeated until the code "1111" indicative of the end of the process is detected from the process instruction 309 in the step S2002. When the end code "1111" is detected in the step S2002, the decompression control unit 601 determines that the final level value Lf is a final decompression level, and further determines which one of the levels 1 to 3 is the final decompression level (step S2008).

After determining the final decompression level, the decompression control unit 601 outputs, EXE1 and EXE2 signals for determining whether or not to perform decompression to the first resolution increasing unit 603 and the second resolution increasing unit 604, respectively. After the final decompression level is determined by the decompression control unit 601, the data decompressing unit 602 decompresses the 300 dpi image data 1007 encoded using the compression technique such as JPEG. The decompressed 300 dpi data packet can be restored to the original resolution by the first resolution increasing unit 603 and the second resolution increasing unit 604 in the next stage, but whether or not to increase resolution is determined by the above-mentioned EXE1 and EXE2 signals.

The 300 dpi data packet input from the date decompression unit 602 to the first resolution increasing unit 603 is written in the encoded data writing buffer 802 by the encoded data writing control unit 801. The code data reading unit 803 sequentially reads out the codes 2_1006 in FIG. 6B, which have been coded in 2×2 blocks, from the encoded data writing buffer 802, and passes them to the data coupling unit 804.

Further, the code data reading unit 803 reads out the 300 dpi image data 1007 and the 300 dpi attribute data 1009, and passes them to the data coupling unit 804. At the same time, as the need arises, the code data reading unit 803 gives the data coupling unit 804 instructions to read out the 600 dpi-300 dpi interpolation data 1008 and the 600 dpi-300 dpi Z interpolation data 1008 for restoring to high-resolution data with a resolution of 600 dpi.

The data coupling unit 804 determines whether or not the EXE1 signal is present, and when the EXE1 signal has been received, the data coupling unit 804 sequentially restores 300 dpi data to 600 dpi data in 2×2 blocks, and writes the restored data in the decompressed data buffer 805. Also, the data coupling unit 804 reads out the header 301 from the encoded data writing buffer 802, and writes the same in the decompressed data buffer 805. At this time, the data coupling unit 804 changes the compress flag 315 in the header 301 to a flag indicative of a state of being decompressed to 600 dpi resolution. Further, information indicative of the byte length and the offset amount of the packet (the packet length 310, the image data offset 311, the attribute data offset 312, the image data length 313, and the attribute data length 314) is also rewritten based on the amount of data decompressed to high-resolution data.

On the other hand, when the EXE1 signal has not been received, the data coupling unit 804 does not perform data restoration, and writes the data packet, which was written in the encoded data writing buffer 802, as it is in the decompressed data buffer 805. In this case, neither the compress flag in the header 301 nor the packet length is changed.

After the data packet restored to 600 dpi (or the 300 dpi data packet in the case where data restoration has not been performed) is written in the decompressed data buffer 805, the decompressed data readout control unit 806 reads out and outputs the data packet so that decompression to high resolution can be performed. It should be noted that an arrangement of the second resolution increasing unit 604 is similar to that of the first resolution increasing unit 603.

When, in the step S2008 in FIG. 8B, it is determined that the final decompression level is the decompression level 1, the decompression control unit 601 does not output the EXE1 and EXE2 signals. In this case, decompression is not performed by the first resolution increasing unit 603 and the second resolution increasing unit 604, and the data packet is passed through them as it is. On the other hand, when it is determined that the final decompression level is the decompression level 2, the decompression control unit 601 outputs only the EXE1 signal, and the first resolution increasing unit 603 increases the resolution from 300 dpi to 600 dpi (step S2010).

Then, the first resolution increasing unit 603 changes the compress flag 315 in the header 301 based on the expanding operation in the step S2010, and also changes the information indicative of the byte length, the offset amount, etc. of the packet based on the amount of data decompressed to high-resolution data (step S2012). The information includes the packet length 310, the image data offset 311, the attribute data offset 312, the image data length 313, and the attribute data length 314. It should be noted that because the EXE2 signal is not output after the step S2012, the second resolution increasing unit 604 does not perform decompression.

When it is determined in the step S2008 that the final decompression level is the decompression level 3, the decompression control unit 601 outputs the EXE1 and EXE2 signals, and the first resolution increasing unit 603 increases the resolution from 300 dpi to 600 dpi (step S2009). Then, the first resolution increasing unit 603 changes the compress flag 315 in the header 301, and changes the byte length, the offset amount, etc. of the packet based on the amount of data decompressed to high-resolution data (step S2011).

Then, the second resolution increasing unit 604 increases the resolution from 600 dpi to 1200 dpi (step S2013), and also changes the contents of the header 301 (step S2014).

In the above described way, a predetermined resolution increasing process is performed according to a decompression level determined based on the process instruction 309.

The data packet decompressed by the image decompressing unit 121 is input to the image-editing image processing unit 120, and is processed by a predetermined processing unit based on the process instruction 309 in the header 301.

FIG. 10 is a block diagram schematically showing an internal arrangement of the image-editing image processing unit 120.

The image-editing image processing unit 120 has a bus switch 401, the color processing unit 402, the rotation processing unit 403, the trimming and masking processing unit 404, the resolution changing processing unit 405, the binary/multilevel coding unit 406, and the white determination unit 407. The color processing unit 402, the rotation processing unit 403, the trimming and masking processing unit 404, the resolution changing processing unit 405, the binary/multilevel coding unit 406, and the white determination unit 407 are connected to the bus switch 401 connected to the image bus 115.

The bus switch 401 checks a beginning part of the process instruction 309 in the header 301 of a data packet input to the image-editing image processing unit 120. Then, the bus switch 401 switches buses according to a unit ID and a mode stored in the beginning part of the process instruction 309, and inputs the data packet to the corresponding processing unit. For example, when a code "0000" indicative of a color process is stored as a first unit ID1, and a code "0011" indicative of a zooming process is stored as a second unit ID2, first, the bus switch 401 switches buses so that the data packet can be input to the color processing unit 402.

After completing the color process, the color processing unit 402 shifts the process instruction 309 to the left by 6 bits. The data packet processed by the color processing unit 402 is input to the bus switch 401 again, and the bus switch 401 checks the process instruction 309 of the data packet again. Because the process instruction 309 has been shifted by the color processing unit 402, and the first unit ID has been changed to the code "0011" indicative of the zooming process, the bus switch 401 switches buses so that the data packet can be input to the resolution changing processing unit 405.

After completing the zooming process, the resolution changing processing unit 405 shifts the process instruction 309 to the left by 6 bits like the color processing unit 402. The data packet processed by the resolution changing processing unit 405 is input to the bus switch 401 again, and the bus switch 401 checks the process instruction 309 of the data packet again. Substantially the same processes as those described above are performed by the rotation processing unit 403, the trimming and masking processing unit 404, the binary/multilevel coding unit 406, and the white determination unit 407 according to contents of the process instruction 309.

When all processes corresponding to the process instruction 309 are to be completed, a code "1111" indicative of the end of the process is stored in advance in the process instruction 309. Upon recognizing the code "1111", the bus switch 401 switches buses so that the data packet can be returned to the image bus 115. The data packet subjected to all processes by the image-editing image processing unit 120 is output from the bus switch 401 to the image bus 115.

It should be noted that the image-editing image processing unit 120 can automatically switch buses and changes processing modes on a data packet-by-data packet basis according to information on unit Id codes and mode codes in the process instruction 309 included in the header 301. Thus, data packets with different jobs and pages, that is, data packets differing in the job ID 306 and the page ID 305 in the header 301 may be input at the same time to the image-editing image processing unit 120. Also, processing modules can be operated in parallel, resulting in the throughput efficiency of the image processing apparatus as a whole being enhanced.

Because in the present embodiment, an appropriate data packet decompression method is selected by referring to the process instruction 309 of a data packet when a decompression level is determined, operations by processing modules can be speeded up. For example, when a color process is performed at the decompression level 1 (300 dpi resolution) on a data packet on which only a color process is to be performed, it is only necessary to perform a process explained hereafter. Namely, it is only necessary to perform a color process on portions relating to color information of the 300 dpi image data 1007, the 1200-600 dpi interpolation data 1003, and the 600-300 dpi interpolation data 1008, and the process can be performed with data maintained in low resolution, so that the process can be speeded up.

A data packet having been subjected to a predetermined process by the image-editing image processing unit 120 is input to the printer image processing unit 119 via the image bus 115 and the device I/F 117. The printer image processing unit 119 performs image processing based on the input data packet, and drivingly controls the printer engine 102 so that predetermined printed outputs can be produced on a recording medium.

As described above, a decompression method for a compressed data packet is selectively determined by referring to the process instruction 309 in the header 301 added to the data packet. Thus, an appropriate processing flow is performed on the compressed data packet. Also, even in a process where data packets of different jobs and different pages are mixed, the image decompressing unit can determine appropriate decompression methods by referring to process instructions, and hence the process can be performed without placing a heavy load on the CPU.

According to the above described embodiment, processing procedure codes (combinations of unit ID codes and mode codes) indicative of a processing procedure of an image process required by each job are stored in order in a header of each data packet. Then, the processing procedure codes added to the header in the data packet are referred to during the image process, and the compressed data packet is decompressed according to the appropriate processing procedure, so that the process can be simplified and speeded up, and decoding modes can be successively switched.

Although in the above described embodiment, the image processing apparatus 100 receives a print job from an external apparatus via the LAN 10 and performs printing, a print job should not always be input in this way. For example, the image processing apparatus 100 can read image data off an original using the scanner 101 and perform printing. In this case, the scanning packet generating unit 132 operates in place of the RIP packet generating unit 131, and the scanner image processing unit 118 operates in place of the RIP unit 116.

In a second embodiment of the present invention, a plurality of sets of unit ID codes and mode codes indicative of a processing procedure to be performed by the color processing unit 402 and the like in the image-editing image processing unit 120 are included in the process instruction 309, a decompression level is determined by the above described process.

As is the case with the first embodiment described above, data packets decompressed by the image decompressing unit 121 are input to the image-editing image processing unit 120, and processing is performed on each data packet based on information of the process instruction 309 in the header 301.

In the present embodiment, for example, when a rotation process and a simple decimating process are to be performed, a data packet is decompressed at the decompression level 2 (600 dpi resolution). As a result, the data packet decompressed at the decompression level 2 is subjected as it is to the rotation process by the rotation processing unit 403, and then subjected to the decimating process by the resolution changing processing unit 405. In this case, by deleting portions other than the image data 1002, the 600 dpi attribute data 104, and the header 301 from the data packet decompressed at the decompression level (600 dpi resolution) shown in FIG. 6A, simple decimation to 600 dpi can be performed. As a result, the process can be speeded up.

A data packet having been subjected to a predetermined process by the image-editing image processing unit 120 is input to the printer image processing unit 119 via the image bus 115 and the device I/F 117. The printer image processing unit 119 performs image processing based on the input data packet, and drivingly controls the printer engine 102 so that predetermined printing on a recording medium can be performed.

As described above, when a plurality of processes are requested to be performed in image processing on a data packet, contents of the plurality of processes are read by referring to a process instruction, and the data packet is decompressed at a decompression level determined as being applicable to all the required image processes. Thus, an appropriate processing flow is performed on each data packet. Also, even in a process where data packets of different jobs and different pages are mixed, the image decompressing unit can determine appropriate decompression methods by referring to process instructions, and hence the process can be performed without placing a heavy load on the CPU.

Although in the above described embodiments, the image processing apparatus 100, the scanner 101, the printer engine 102, and the console 110 are configured as separate units as shown in FIG. 1, they may be configured as an integral unit.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-036122 filed Feb. 22, 2010, which is hereby incorporated by reference herein in its entirety.

What is claimed is:

1. An image processing apparatus comprising:
a plurality of image processing units that perform different kinds of image processing;
a storing unit configured to store a table indicating suitable resolutions respectively corresponding to the different kinds of image processing;
a generating unit configured to add, to a block of image data, first information indicating a present resolution thereof and second information indicating at least one kind of image processing to be performed by the plurality of image processing units on the block of image data to generate a data packet;
a compressing unit configured to compress the block of image data in the data packet, wherein each of the different kinds of image processing performed by the plurality of image processing units is different from image processing performed by the compressing unit;
a calculating unit configured to calculate, based on the table, a maximum resolution among suitable resolutions of the at least one kind of image processing indicated by the second information; and
a decompressing unit configured to decompress the compressed block of image data into the maximum resolution calculated by the calculating unit,
wherein when the calculated maximum resolution is equal to the present resolution indicated by the first information, the decompressing unit does not decompress the compressed block of image data.

2. An image processing apparatus according to claim 1, wherein:
said compressing unit compresses the block of image data by generating, from the block of image data, low-resolution data with a lower resolution than a resolution of the block of image data and interpolation data required for restoring the low-resolution data to original image data, and
said generating unit adds the information to the low-resolution data and the interpolation data.

3. An image processing apparatus according to claim 1, wherein the second information comprises a plurality of sets of a unit ID code assigned to each of the plurality of image processing units, and a mode code indicative of a processing mode in each of the plurality of image processing units, and the sets are stored in an order in which the sets should be processed.

4. An image processing apparatus according to claim 3, wherein the mode code in each of the sets is a value indicating that no mode code is required.

5. An image processing apparatus according to claim 1, wherein job ID codes assigned so as to manage jobs, and page ID codes assigned to pages to which the block of image data correspond are added as headers of the compressed block of image data.

6. An image processing apparatus according to claim 1, wherein packet ID codes indicative of coordinates on page data of the block of image data are added as headers of the compressed block of image data.

7. An image processing apparatus according to claim 1, wherein:
said compressing unit compresses the block of image data in a plurality of stages, and
said calculation unit calculates the decompression resolution for decompression to stages required for performing the respective processes indicated by the information, and calculates the decompression resolution for decompression to a stage in which all the processes indicated by the information is performable.

8. An image processing apparatus according to claim 1, wherein in a case where a color of a predetermined one pixel in the block of image data is typical color information of the image data, the interpolation data comprises a plurality of pieces of color information obtained from remaining pixels.

9. An image processing apparatus according to claim 1, wherein the processes performed by the image processing units include color conversion, resolution change, rotation, trimming, masking, binary cording, multilevel coding, or blank sheet determination on the image data.

10. An image processing apparatus according to claim 1, wherein the block of image data where the first information and the second information are to be added by the generation unit is one of a plurality blocks of image data into which a page data is divided.

11. An image processing method for an image processing apparatus including a plurality of image processing units that perform different kinds of image processing on a block of image data, respectively, the method comprising:

a storing step of storing a table indicating suitable resolutions respectively corresponding to the different kinds of image processing;
a generating unit step of adding, to a block of image data, first information indicating a present resolution thereof and second information indicating at least one kind of image processing to be performed by the plurality of image processing units on the block of image data to generate a data packet;
a compressing step of compressing the block of image data in the data packet, wherein each of the different kinds of image processing performed by the plurality of image processing units is different from image processing performed in the compressing step;
a calculating step of calculating, based on the table, a maximum resolution among suitable resolutions of the at least one kind of image processing indicated by the second information; and
a decompressing step of decompressing the compressed block of image data into the maximum resolution calculated in the calculating step,
wherein when the calculated maximum resolution is equal to the present resolution indicated by the first information, the decompressing step does not decompress the compressed block of image data.

12. A non-transitory storage medium storing a computer-readable program executable by an image processing apparatus to execute an image processing method for the image processing apparatus, which includes a plurality of image processing units that perform different kinds of image processing on a block of image data, respectively, the method comprising:

a storing step of storing a table indicating suitable resolutions respectively corresponding to the different kinds of image processing;
a generating unit step of adding, to a block of image data, first information indicating a present resolution thereof and second information indicating at least one kind of image processing to be performed by the plurality of image processing units on the block of image data to generate a data packet;
a compressing step of compressing the block of image data in the data packet, wherein each of the different kinds of image processing performed by the plurality of image processing units is different from image processing performed in the compressing step;
a calculating step of calculating, based on the table, a maximum resolution among suitable resolutions of the at least one kind of image processing indicated by the second information; and
a decompressing step of decompressing the compressed block of image data into the maximum resolution calculated in the calculating step,
wherein when the calculated maximum resolution is equal to the present resolution indicated by the first information, the decompressing step does not decompress the compressed block of image data.

* * * * *